Figure 1:
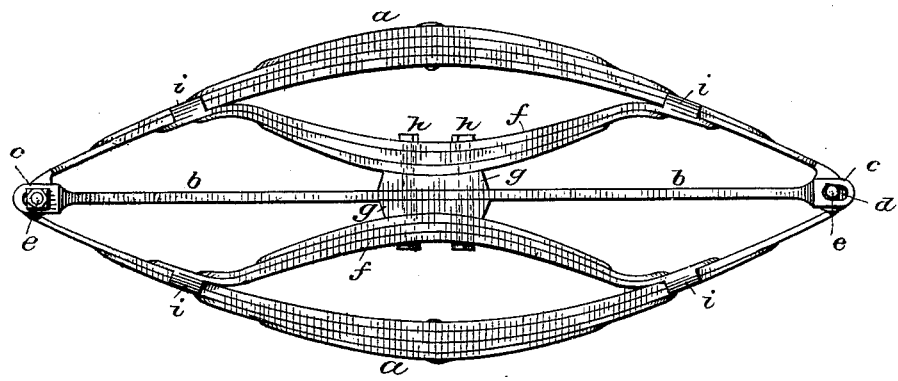

N. J. GOVER.
Vehicle-Spring.

No. 218,255. Patented Aug. 5, 1879.

UNITED STATES PATENT OFFICE.

NATHANIEL J. GOVER, OF OREGON, MARYLAND.

IMPROVEMENT IN VEHICLE-SPRINGS.

Specification forming part of Letters Patent No. 218,255, dated August 5, 1879; application filed June 7, 1879.

*To all whom it may concern:*

Be it known that I, NATHANIEL J. GOVER, of Oregon, Baltimore county, Maryland, have invented an Improvement in Vehicle-Springs, of which the following is a specification.

My invention relates to elliptical steel springs; and consists of certain details of construction hereinafter fully described, by which the spring is supported at points most liable to fracture, and is rendered steadier in its action, and more durable.

Heretofore the ordinary elliptical spring has been supported in various ways, in order to give it stability and to increase its strength. The weakest part of these springs, and that, after long-continued use, most liable to break, is at the thinner portions of the spring. A little more than half-way from the center to the ends of these points I have re-enforced so as to give them material support without detracting seriously from their resilience; and I have also strengthened and steadied the spring in its action by means of a longitudinal bar extending from end to end.

My improved spring is shown in side view.

In the drawing, $a\,a$ represent the upper and lower parts of an ordinary longitudinal spring, and $b$ represents a bar extending from one end of the spring to the other. This bar is formed at each end with ears $c\,c$, between which the ends of the springs $a\,a$ fit snugly. The ears $c\,c$ are slotted, as shown at $d$, where the head of the bolt is represented as removed, in order to show the slot. The bolt $e$ passes through the ears $c\,c$ and through the ends of the springs $a\,a$, holding the ends of the said springs in the usual manner. The slots should be made of sufficient length to allow proper movement of the springs longitudinally under any load to which they would ordinarily be subjected. On each side of this longitudinal bar I have shown an auxiliary spring, $f\,f$. Each one of these springs rests upon a block, $g\,g$, interposed between it and the longitudinal bar.

The springs and the block are securely held in place by bolts $h\,h$, passing through the springs, the blocks, and the bar, said bolts being secured by nuts in the ordinary manner. The ends of the springs $f\,f$ are provided with flanges $i\,i$, which clamp the plates of the longitudinal springs $a$, holding them securely in place, but permitting the spring $f$ to move upon the spring $a$ as much as may be necessary. When the spring is in action, the springs $a$, as well as the supplementary springs $f$, may be made of as many plates as may be desired, according to the use for which the spring is intended.

The supplementary springs, being bolted firmly to the longitudinal bar, give the whole structure great firmness and stability, and, at the same time, support the springs $a\,a$ in those parts most liable to break after long-continued use.

The blocks $g\,g$ may be omitted, if desirable, and the springs $f\,f$ be brought in contact with the longitudinal bar.

These springs are adapted to be used upon carriages and other places where light springs are required; or they may be made sufficiently heavy for heavier work, the construction permitting either light or heavy material, as circumstances may require.

I am aware that longitudinal springs have been connected by a yielding bar or spring, extending from one end of the longitudinal spring to the other; and I am also aware that springs have been interposed between the bows of an ordinary spring of the class shown by me.

What I claim, and desire to secure by Letters Patent of the United States, is—

1. The combination of the springs $a\,a$, the central bar $b$, the slotted ears $c$, and the connecting-bolts, as and for the purpose set forth.

2. The combination of the springs $a\,a$, the bar $b$, and the springs $f$, as and for the purpose set forth.

3. The combination of the springs $a\,a$ and $f\,f$, the bar $b$, the interposed blocks $g\,g$, and the connecting-bolts, which pass through springs and block, as set forth.

4. The combination of the spring $a$, the bar $b$, with its slotted connections, and spring $f\,f$, bolted to the bar $b$, and provided with flanges embracing the springs $a$ at the points described, as and for the purpose set forth.

In testimony whereof I have signed my name to this specification in the presence of two subscribing witnesses.

NATHANIEL J. GOVER.

Witnesses:
L. W. SEELY,
C. CLARENCE POOLE.